United States Patent
Inomata et al.

[11] Patent Number: 6,120,585
[45] Date of Patent: Sep. 19, 2000

[54] REFLOW SOLDERING DEVICE

[75] Inventors: Akio Inomata, Yamanashi; Masaru Nonomura, Kofu; Masuo Masui, Yamanashi; Naoichi Chikahisa, Kofu, all of Japan

[73] Assignee: Matsushita Electric Industrial Co., Ltd., Osaka, Japan

[21] Appl. No.: 09/155,932

[22] PCT Filed: May 12, 1997

[86] PCT No.: PCT/JP97/01608

§ 371 Date: Oct. 7, 1998

§ 102(e) Date: Oct. 7, 1998

[87] PCT Pub. No.: WO97/43884

PCT Pub. Date: Nov. 20, 1997

[30] Foreign Application Priority Data

May 15, 1996 [JP] Japan ................................. 8/120371

[51] Int. Cl.[7] .................................................. B01D 46/00
[52] U.S. Cl. .................... 96/377; 55/315.1; 55/385.1; 55/467.1; 96/420; 96/421
[58] Field of Search ............................ 96/351, 372, 377, 96/421, 420; 95/288, 290; 55/315.2, 315.1, 319, 320, 321, 322, 385.1, 385.2, 385.6, 490.1, 490.2, 467, 467.1

[56] References Cited

U.S. PATENT DOCUMENTS

| | | | |
|---|---|---|---|
| 3,421,666 | 1/1969 | Lawson | 55/472 |
| 4,909,430 | 3/1990 | Yokota | 228/102 |
| 4,912,857 | 4/1990 | Parent et al. | 34/148 |
| 5,573,688 | 11/1996 | Chanasyk et al. | 219/388 |
| 5,611,476 | 3/1997 | Soderlund et al. | 222/42 |
| 5,623,829 | 4/1997 | Nutter et al. | 62/5 |
| 5,641,341 | 6/1997 | Heller et al. | 95/288 |
| 5,993,500 | 11/1999 | Bailey et al. | 55/467.1 |

FOREIGN PATENT DOCUMENTS

| | | |
|---|---|---|
| 56-169897 | of 1981 | Japan . |
| 63-79926 | 5/1988 | Japan . |
| 1-203024 | 8/1989 | Japan . |
| 4-46667 | 2/1992 | Japan . |
| 4-258368 | 9/1992 | Japan . |
| 5-87987 | 11/1993 | Japan . |
| 5-93079 | 12/1993 | Japan . |

*Primary Examiner*—Duane S. Smith
*Attorney, Agent, or Firm*—Jordan and Hamburg LLP

[57] ABSTRACT

A reflow soldering device extracts a vaporized component of a contaminative material, such as flux, from exhaust gas from a reflow furnace. The device includes a conveyor for transferring a circuit substrate, a heater for heating the transferred circuit substrate, a cooler for cooling the circuit substrate which has been reflow soldered by heater, discharge pipes and a discharge blower for discharging an exhaust gas at high temperature from the heater to the outside of the device, and a flux remover mounted in the discharge pipes which cools the exhaust gas to 70° C. and below, preferably 60° C. and below, so as to cause a vaporized component, such as flux contained in the exhaust gas, to become liquid or solid and to be removed.

12 Claims, 7 Drawing Sheets

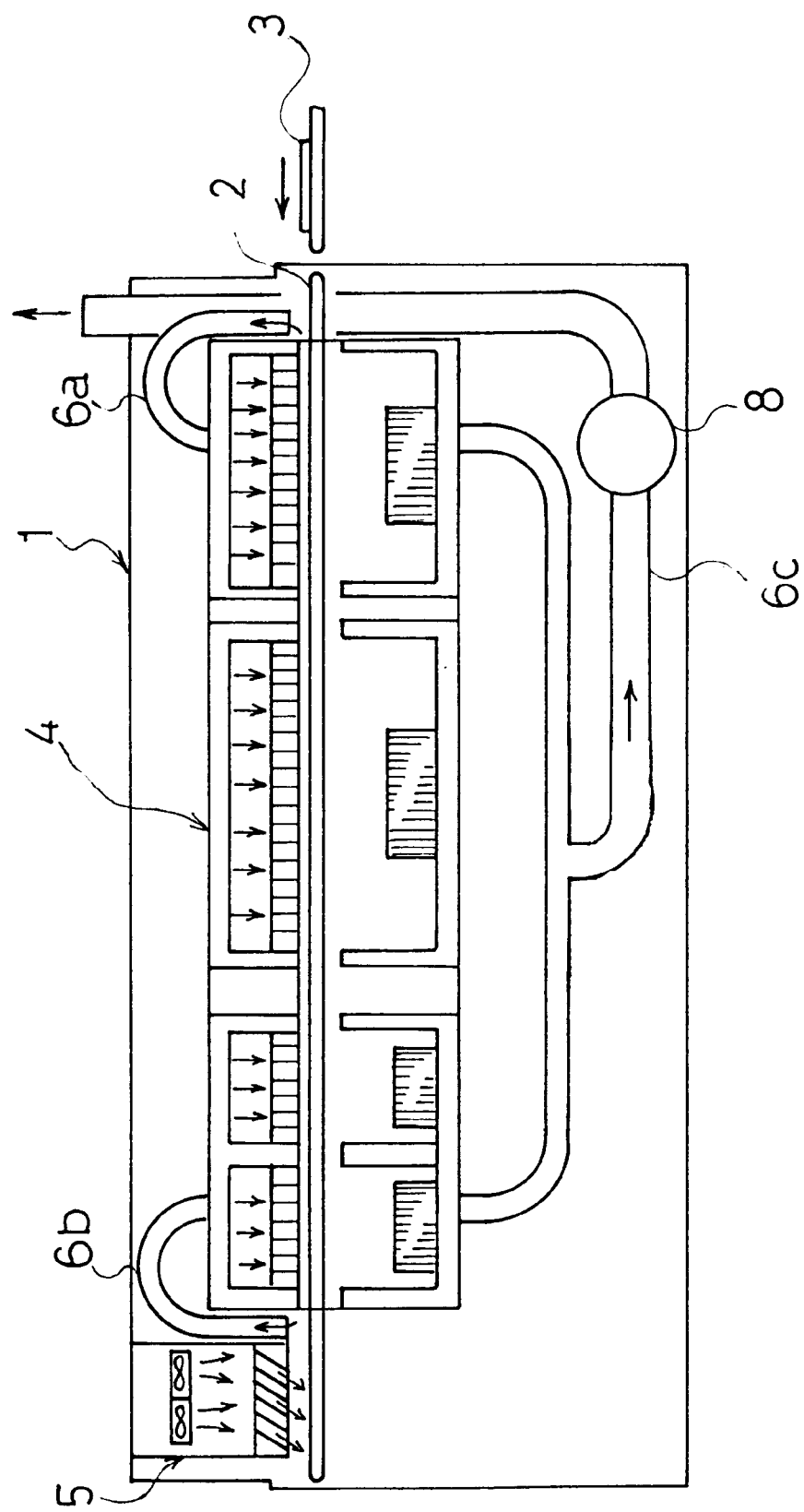

REFLOW SOLDERING DEVICE

BACKGROUND OF THE INVENTION

The present invention relates to a reflow soldering device for mounting an electronic component on a circuit substrate by soldering.

One example of conventional reflow soldering device will be explained with reference to FIG. 11.

In FIG. 11, the conventional reflow soldering device 1 includes a conveyor means 2 for transferring a circuit substrate 3 which is loaded in, a heating means 4 for preliminarily heating the transferred circuit substrate 3 and reflow heating the same, a cooling means 5 for cooling the reflow soldered circuit substrate 3, discharge pipes 6a, 6b, 6c for letting out a gas of high temperature escaped from the entrance and exit of the heating means 4 to the outside, and a discharge blower 8 mounted in the discharge pipe 6c.

Exhaust gas from the discharge pipes 6a, 6b, 6c is discharged to the outside through a duct in the factory.

However, in the above described conventional structure, as the exhaust gas passes through the duct in the factory, a vaporized component such as flux contained in the gas becomes liquid or solid, and is deposited in the duct, causing decrease in the discharging capacity; there has thus been a problem that a large amount of time has to be spent for removing such deposited material.

An object of the present invention is to provide a reflow soldering device by which the above described problems can be solved and contaminative materials such as flux generated during the reflowing process can be sufficiently removed from the exhaust gas from a reflow furnace.

DISCLOSURE OF INVENTION

To accomplish the above object, according to the first feature of the present invention, the reflow soldering device is characterized by having a conveyor means for transferring a circuit substrate, a heating means for heating the transferred circuit substrate, a cooling means for cooling the circuit substrate which has been reflow soldered by the heating means, discharge pipes and a discharge blower for discharging an exhaust gas at of high temperature, escaped from the heating means, to the outside of the device, and a flux removing means mounted in the discharge pipes for removing a vaporized component such as flux contained in the exhaust gas by cooling the exhaust gas to a temperature lower than a temperature at which the flux vaporized component in the solder becomes liquid or solid.

In the reflow soldering device according to the first feature of the present invention, since the exhaust gas high temperature, escaped from the heating means, is cooled by the flux removing means to a temperature at which the vaporized flux component in the solder becomes liquid or solid, the vaporized flux component, which starts liquefying or solidifying more or less at 100° C., can be sufficiently liquefied or solidified to be removed in a short time during which the exhaust gas passes through the flux removing means.

Also, in the reflow soldering device of the first feature of the present invention, it may be constructed such that the exhaust gas at high temperature, escaped from the heating means, is transformed to the exhaust gas of low temperature, for example 70° C. and below, by the flux removing means by mixing outdoor air at room temperature into the exhaust gas, by which the liquefied or solidified component such as flux is strained and removed, whereby the device can be most simplified in its construction.

Also, in the reflow soldering device of the first feature of the present invention, it may be constructed such that the exhaust gas at high temperature escaped from the heating means, is transformed into the exhaust gas at low temperature, for example 70° C. and below, by the flux removing means by mixing a gas at a temperature which is lower than the room temperature into the exhaust gas, by which the liquefied or solidified component such as flux is strained and removed, whereby the amount of the gas which is mixed in can be reduced and thereby the flux removing means can be minimized in size.

Also, in the reflow soldering device of the first feature of the present invention, it may be constructed such that the exhaust gas at high temperature, escaped from the heating means, is transformed into the exhaust gas at low temperature, for example 70° C. and below, by the flux removing means by mixing a gas at a temperature which is controlled at a predetermined degree into the exhaust gas, by which the liquefied or solidified component such as flux is strained and removed, whereby the amount of the gas which is mixed in can be reduced and thereby the flux removing means can be minimized in size, and the vaporized component such as flux can be certainly removed. Furthermore, by constructing such that the temperature of the exhaust gas before and after it is strained is detected, and controlled to be kept at 70° C. and below by the flux removing means, it is further ensured that the vaporized component such as flux is removed.

Also, in the reflow soldering device of the first feature of the present invention, it may be constructed such that the exhaust gas at high temperature, escaped from the heating means, is passed through a liquid in a tank which is built in the flux removing means and thereby transformed into the exhaust gas at low temperature, for example 70° C. and below, by which the liquefied or solidified component such as flux is accumulated in the liquid and removed, whereby the device is simplified in construction and the vaporized component such as flux can be certainly removed.

Also, in the reflow soldering device of the first feature of the present invention, it may be constructed such that the flux removing means has a built-in heat exchange cooling means in which a gas or liquid at low temperature is passed through in a sealed state, and the exhaust gas at high temperature, escaped from the heating means, is placed in contact with the heat exchange cooling means and thereby transformed to the exhaust gas of low temperature, for example 70° C. and below, by which the liquefied or solidified component such as flux can be strained and removed, by which the amount of air blown by the discharge blower is made equal to the amount of the discharged exhaust gas, and control of the amount of discharge of the exhaust gas is facilitated.

Also, in the reflow soldering device of the first feature of the present invention, it may be constructed such that the flux removing means compares the pressure of the exhaust gas flowed in and that of the exhaust gas which flows out, detects the difference in the pressure, and, if the difference in pressure exceeds a predetermined value, generates an alarm for indicating that the filter is clogged, by which troubles caused by clogged filters can be prevented.

In order to solve the above described conventional problems, the reflow soldering device according to a second feature of the present invention is characterized by having a conveyor means for transferring a circuit substrate, a heating means for heating the transferred circuit substrate, a cooling means for cooling the circuit substrate which has been reflow soldered by the heating means, discharge pipes and a discharge blower for discharging an exhaust gas at high temperature, escaped from the heating means, to the outside of the device, and a flux removing means mounted in the discharge pipes including a built-in tank in which a solvent is contained so that the exhaust gas at high temperature, escaped from the heating means, is passed through the solvent and a vaporized component such as flux contained in the exhaust gas is dissolved in the solvent and removed.

According to the reflow soldering device of the second feature of the present invention, a vaporized component such as flux contained in the exhaust gas is dissolved in the solvent and can be removed by passing the exhaust gas at high temperature, escaped from the heating means through the solvent with the use of the flux removing means.

BRIEF DESCRIPTION OF DRAWINGS

FIG. 11 is a cross-sectional view of a conventional reflow soldering device.

BEST MODES FOR CARRYING OUT THE INVENTION

Vaporized components such as flux contained in an exhaust gas at high temperature which escapes from the entrance and exit of the heating means 4 normally start to become either liquid or solid when cooled to a temperature of approximately 100° C., although there is a difference to a degree depending on the kind of flux. A further reduction in temperature shortens the time required for liquefaction or solidification.

In the reflow soldering device 1 of the present invention, a flux removing means 7, which will be described in detail later, removes any vaporized components such as flux with a filter by sufficiently liquefying or solidifying the vaporized flux component contained in the solder by cooling the exhaust gas to a temperature at which the flux component becomes liquid or solid, preferably 70° C. and below, or even more preferably to 60° C. and below, in a short time during which the gas passes through the flux removing means 7, by means of mixing a large amount of gas at room temperature into the exhaust gas at high temperature, mixing a gas at low temperature into the exhaust gas at high temperature, cooling the exhaust gas at high temperature with a heat exchanger, cooling the exhaust gas at high temperature by passing it through a liquid of low temperature, or any other like means. Alternatively, the flux removing means 7 is constructed such that the exhaust gas at high temperature is passed through a solvent so as to remove the vaporized flux component dissolved in the solvent.

Furthermore, the flux removing means has a mechanism for exchanging its filter, in case the difference in pressure of the exhaust gas between the entrance side and the exit side of the flux removing means 7, which is monitored, exceeds a prescribed limit, in order to ensure the function of the filter, to maintain the discharging capacity of the exhaust gas, and to sufficiently remove the flux or the like which is liquefied or solidified.

A first embodiment of the reflow soldering device of the present invention will be explained with reference to FIG. 1 to FIG. 3. In this embodiment, the exhaust gas at high temperature is cooled down to 70° C. and below by mixing a gas at room temperature as the cooling gas.

Figure 1:
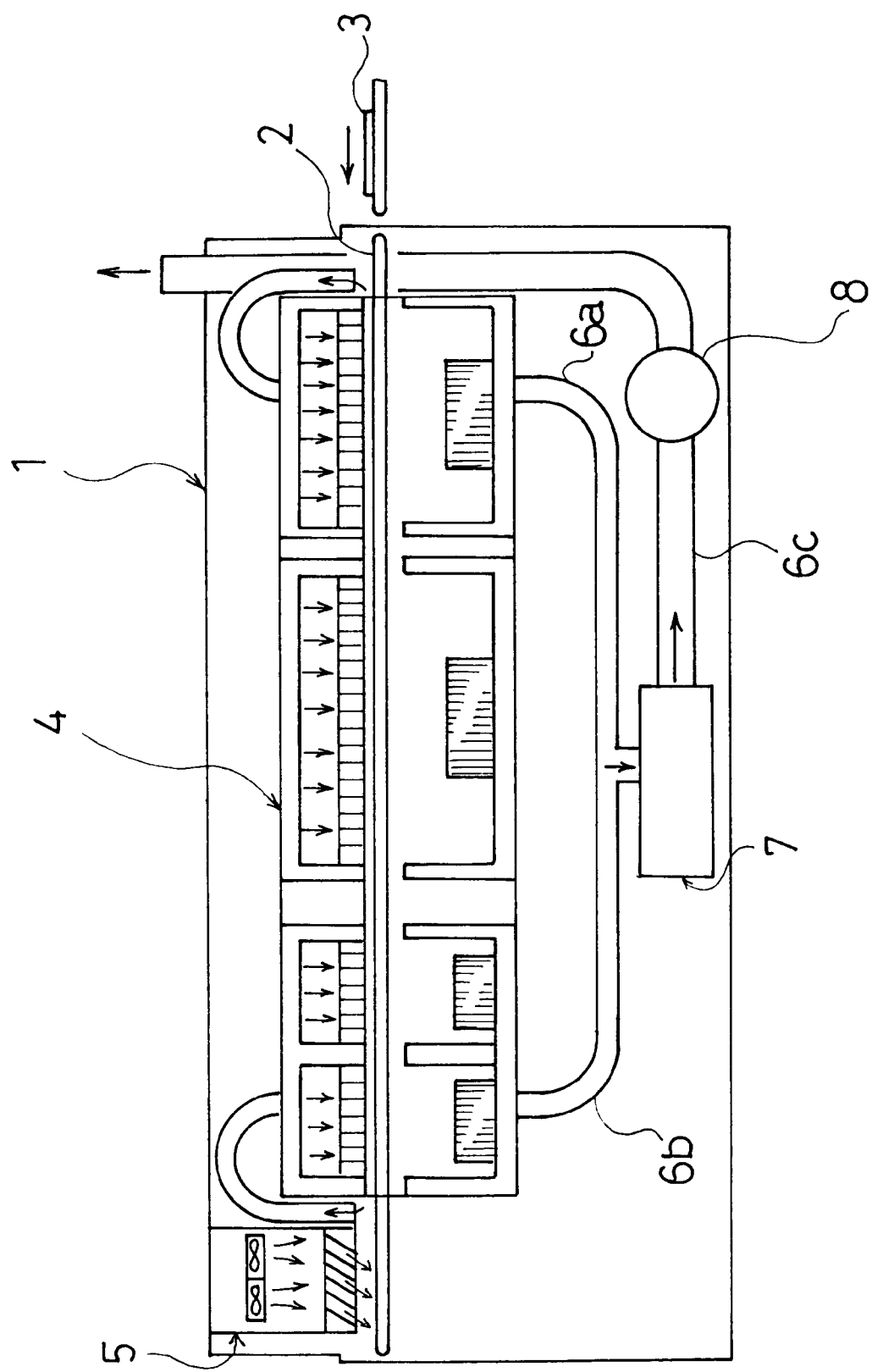
FIG. 1 is a cross-sectional view of a reflow soldering device.

In FIG. 1, the reflows soldering device 1 of this embodiment includes a conveyor means 2 for transferring a circuit substrate 3 which is loaded in, a heating means 4 for preliminarily heating the transferred circuit substrate 3 and reflow heating the same, a cooling means 5 for cooling the reflow soldered circuit substrate 3, discharge pipes 6a, 6b, 6c for letting out a gas at high temperature discharged from the entrance and exit of the heating means 4 to the outside, a flux removing means 7 mounted in the discharge pipe 6c for removing any vaporized components such as flux contained in the exhausted gas with a built-in filter by sufficiently liquefying or solidifying the vaporized components by mixing a large amount of outdoor air with the exhaust gas at high temperature and thereby cooling the exhausted gas to 70° C. and below, and a discharge blower 8 mounted in the discharge pipe 6c at a downstream side with respect to the flux removing means 7.

Next, the flux removing means 7 of this embodiment will be explained referring to FIG. 2 and FIG. 3.

Figure 2:
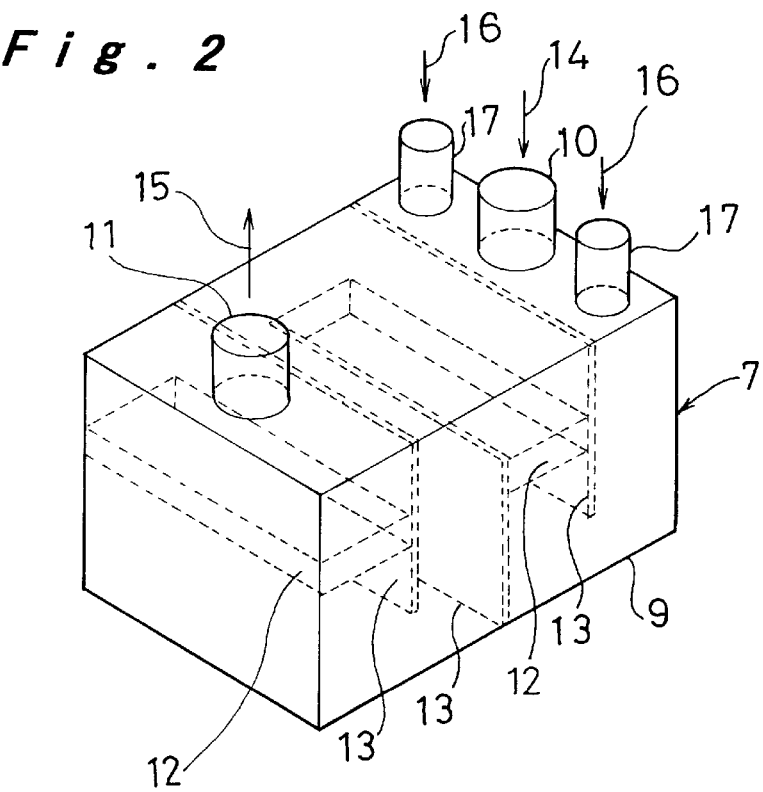
FIG. 2 is a perspective view showing a flux removing means in the reflow soldering device according to a first embodiment of the present invention.

In FIG. 2, the flux removing means 7 of this embodiment is provided with at one end of a case 9 an exhaust gas intake port 10 which connects to the discharge pipes 6a and 6b, through which the exhaust gas 14 escaped from the heating means 4 is sucked in from the discharge pipes 6a and 6b, and a pair of outdoor air intake ports 17, 17 which communicate with the outdoor air for sucking in the outdoor air 16, 16. The suction force for taking in the gas or air is created by the discharge blower 8 shown in FIG. 1.

At the other end of the case 9 is mounted an exhaust gas discharge port 11 which connects to the discharge pipe 6c for discharging the exhaust gas 15. This discharged exhaust gas 15 is conveyed to the duct in the factory by the function of the discharge blower 8 shown in FIG. 1.

Inside the case 9, a zigzag passage is formed by the provision of partition walls 13, 13, 13, so that the exhaust gas 14, which has been sucked in through the exhaust gas intake port 10, and the outdoor air 16, 16, which has been sucked in through the outdoor air intake ports 17, 17, mix with each other sufficiently by the time they are discharged through the exhaust gas discharge port 11. The opening area of the outdoor intake ports 17, 17 can be adjusted for controlling the amount of outdoor air 16, 16 such that the temperature of the mixed gas of the exhaust gas 14 and the outdoor air 16, 16 decreases to 70° C. and below in the zigzag passage. Filters 12, 12, are provided in the zigzag passage for removing the vaporized flux component contained in the exhaust gas 14 which has been sucked in and is either liquefied or solidified at the temperature of 70° C. and below. Preferably, a stirrer may be provided within the case 9 for further promoting the mixing of the exhaust gas 14 with the outdoor air 16, 16.

With the above described construction, the reflow soldering device 1 of this embodiment is capable of removing the vaporized component such as flux which starts to become liquid or solid more or less at 100° C. by making the gas into liquid or solid in a short period of time during which the gas is passed through the flux removing means 7.

Figure 3:
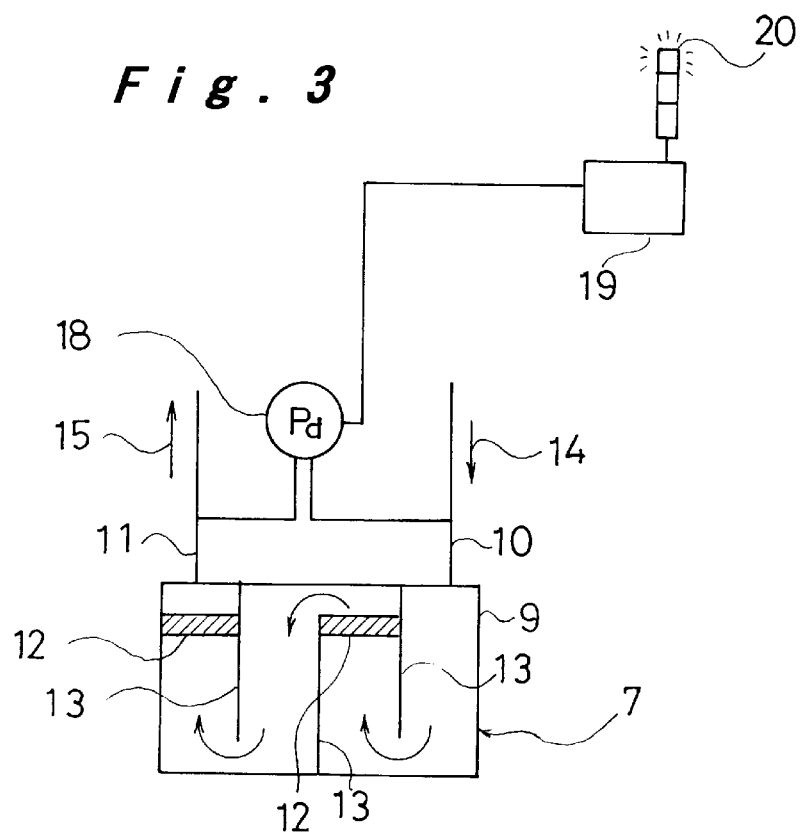
FIG. 3 is a typical view showing primary parts of the flux removing means in the reflow soldering device according to the first embodiment of the present invention.

As shown in FIG. 3, the flux removing means 7 of this embodiment is also provided with a differential pressure gauge 18 for detecting the difference in pressure between the exhaust gas 14 which is sucked in and the exhaust gas 15 which is discharged. When the filters 12, 12 are not clogged and fully functioning, the pressure difference is kept lower than a predetermined value, while, if the filters 12, 12 become clogged and stop functioning, the pressure difference will exceed the predetermined value. For that reason, a control unit 19 monitors the pressure difference and, in case the pressure difference exceeds the predetermined value, it generates an alarm and illuminates an alarm lamp 20. Thereupon the filters 12, 12 are replaced with new ones.

With the above described construction, the reflow soldering device 1 of this embodiment is capable of preventing any troubles caused by clogged up filters 12.

A second embodiment of the reflow soldering device will be described referring to FIG. 1 and FIGS. 4 to 6. In this embodiment, the exhaust gas at high temperature is cooled down to 70° C. and below by mixing in a gas at a temperature which is lower than the room temperature as the cooling gas.

The structure of the reflow soldering device 1 of this embodiment, shown in FIG. 1, is identical to that of the first embodiment except for the flux removing means 7, and thus the description thereof with reference to FIG. 1 will be omitted.

Figure 4:
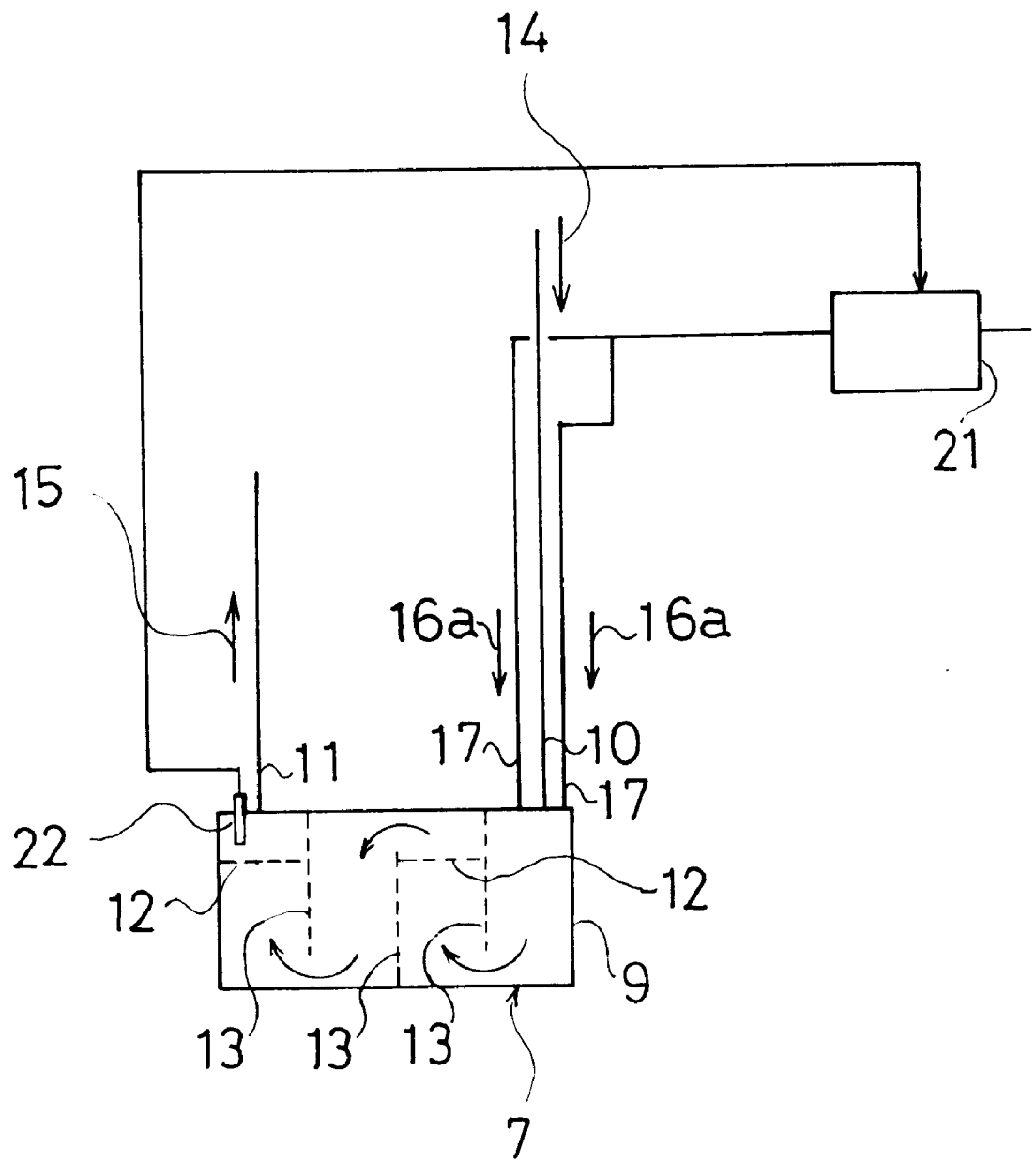
FIG. 4 is a typical view showing primary parts of the flux removing means in the reflow soldering device according to a second embodiment of the present invention.

In FIG. 4, the inside of the case 9 of the flux removing means 7 in this embodiment is similarly constructed as that of the first embodiment. It is different from the first embodiment in that cool air 16a, 16a of which temperature is controlled so as to be cooler than the room temperature is sucked into the case 9.

The cool air 16a, 16a is supplied from a temperature control blower 21 which has a built-in cooler. The temperature control blower 21 controls the amount and temperature of blown air based on the temperature detected by a temperature detecting sensor 22 provided in the vicinity of the exit of the case 9, such that the temperature of the mixed gas of the exhaust gas 14 and the cool air 16a, 16a becomes 70° C. and below.

Figure 5:
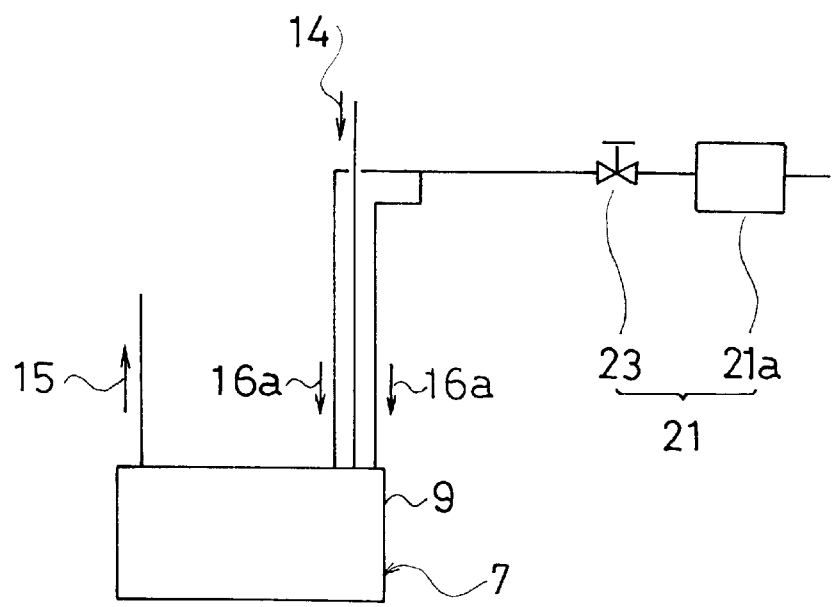
FIG. 5 is a typical view showing primary parts of the flux removing means in the reflow soldering device according to the second embodiment of the present invention.

The temperature control blower 21 may be constituted with a container 21a of liquid nitrogen and a flow adjusting valve 23 as shown in FIG. 5.

Figure 6:
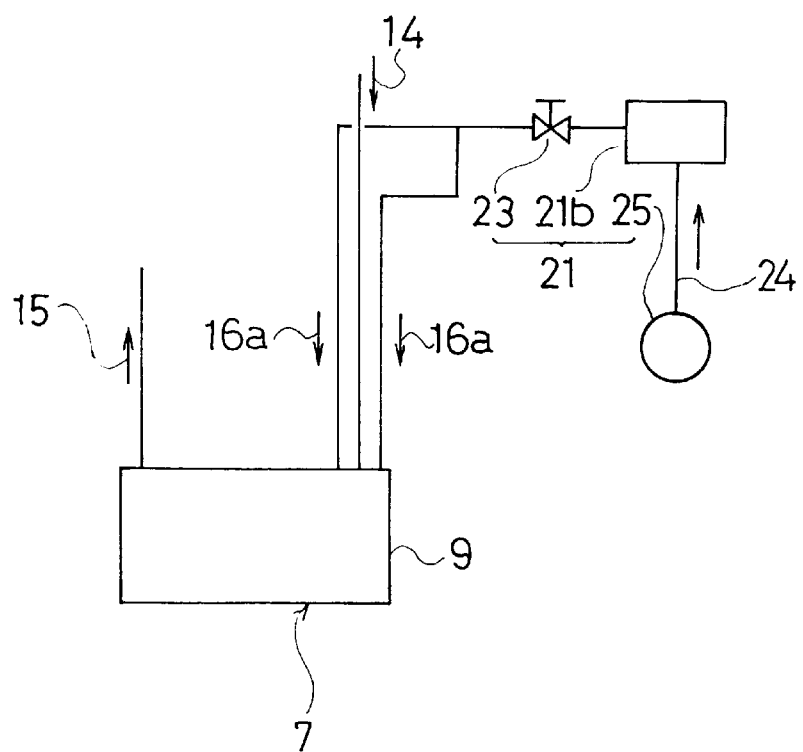
FIG. 6 is a typical view showing primary parts of the flux removing means in the reflow soldering device according to the second embodiment of the present invention.

Alternatively, the temperature control blower 21 may be constituted with a compressor 25, an air flow cooling means 21b which cools air by heat exchange with compressed air 24 from the compressor 25, and the flow control valve 23 as shown in FIG. 6.

As described above, the reflow soldering device of this embodiment has the advantage that it does not require a large amount of cooling gas for mixing in and thus can minimize the size of the flux removing means 7.

A third embodiment of the reflow soldering device of the present invention will be described referring to FIG. 1 and FIG. 7. In this embodiment, the exhaust gas of high temperature is passed through a solvent, by which vaporized components such as flux are dissolved in the solvent and removed.

The structure of the reflow soldering device 1 of this embodiment shown in FIG. 1 is identical to that of the first embodiment except for the flux removing means 7, and thus the description thereof with reference to FIG. 1 will be omitted.

Figure 7:
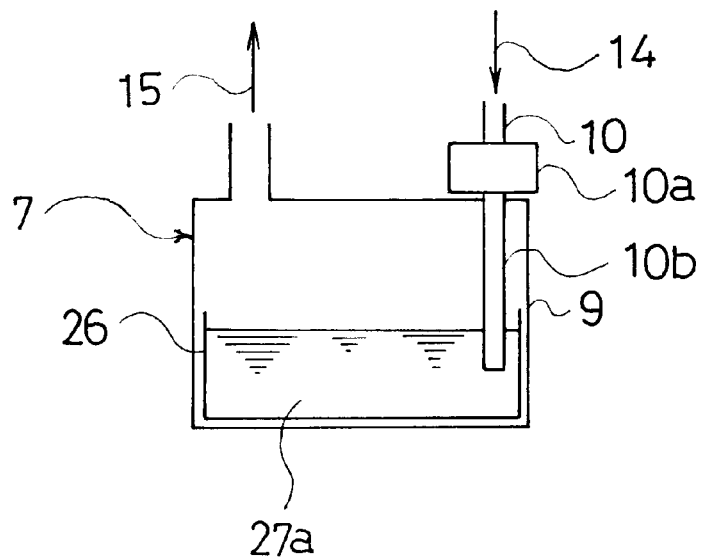
FIG. 7 is a typical view showing primary parts of the flux removing means in the reflow soldering device according to a third embodiment of the present invention.
Figure 8:
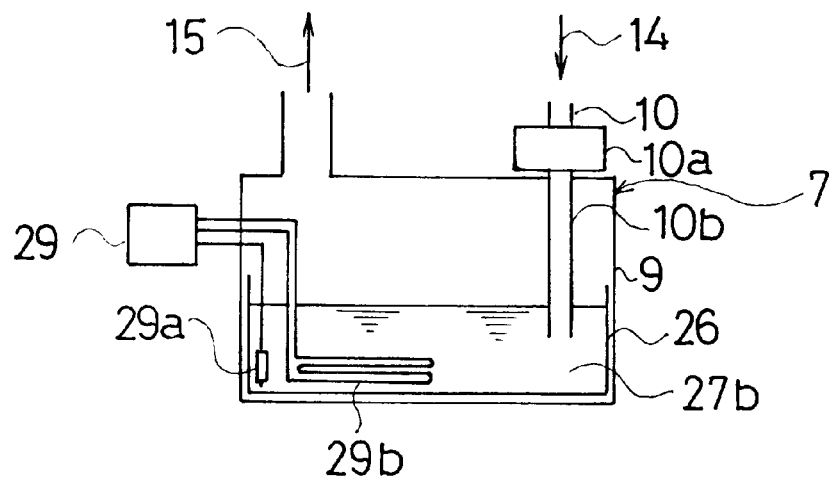
FIG. 8 is a typical view showing primary parts of the flux removing means in the reflow soldering device according to a fourth embodiment of the present invention.

In FIG. 7, within the case 9 of flux removing means 7a in this embodiment, there is a tank 26 in which a solvent 27a, for example ethanol, is contained, in which the flux is soluble and which is not poisonous even if vaporized and discharged. A blower 10a is mounted at the exhaust gas intake port 10, by which the exhaust gas 14 is sucked in. The exhaust gas 14 is then blown into the solvent 27a in the tank 26 through the blowing port 10b. The vaporized components such as flux in the exhaust gas 14 which is sucked in dissolve in the solvent 27a and can be removed. In this case, a temperature controller 29 which comprises a temperature sensor 29a and a cooling device 29b may be mounted in the tank 26 as shown in FIG. 8, by which evaporation of the solvent 27a can be prevented.

With the above described construction, the reflow soldering device 1 of this embodiment is capable of certainly removing vaporized components such as flux.

A fourth embodiment of the reflow soldering device of the present invention will be described referring to FIG. 1 and FIG. 8. In this embodiment, the exhaust gas 14 at high temperature is passed through water of low temperature and is cooled down to 70° C. and below, by which vaporized components such as flux are liquefied or solidified in the water and removed.

The structure of the reflow soldering device 1 of this embodiment shown in FIG. 1 is identical to that of the first embodiment except for the flux removing means 7, and thus the description thereof with reference to FIG. 1 will be omitted.

In FIG. 8, there is a tank 26 within the case 9 of a flux removing means 7b, in which water 27b is contained. A blower 10a is mounted at the exhaust gas intake port 10, by which the exhaust gas 14 is sucked in. The exhaust gas 14 is then blown into the water 27b in the tank 26 through the blowing port 10b. The exhaust gas 14 which is sucked in is thereby cooled down to 70° C. and below, by which vaporized components such as flux are liquefied or solidified in the water 27a and removed.

Although water is used in this embodiment, the cooling medium is not limited to water and can be replaced by any other liquid.

With the above described construction, the reflow soldering device 1 of this embodiment can be simplified in its construction yet is capable of certainly removing vaporized components such as flux.

A fifth embodiment of the reflow soldering device of the present invention will be described referring to FIG. 1 and FIG. 9. In this embodiment, the exhaust gas at high temperature is cooled by a heat exchange means to 70° C. and below, by which vaporized components such as flux are liquefied or solidified and removed with a filter.

The structure of the reflow soldering device 1 of this embodiment shown in FIG. 1 is identical to that of the first embodiment except for the flux removing means 7, and thus the description thereof with reference to FIG. 1 will be omitted.

Figure 9:
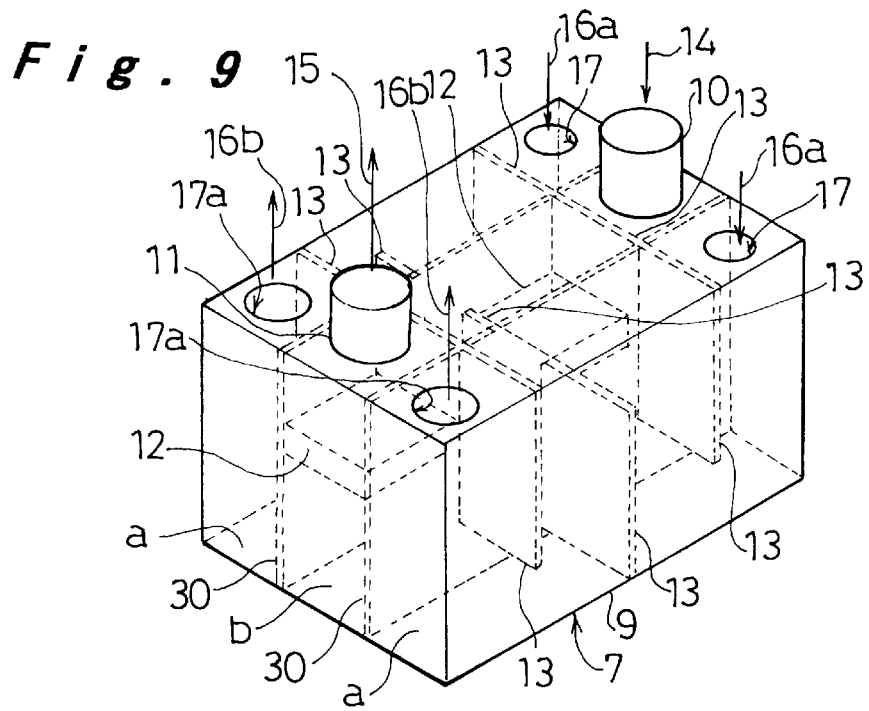
FIG. 9 is a perspective view showing primary parts of the flux removing means in the reflow soldering device according to a fifth embodiment of the present invention.

In FIG. 9, the inside of the case 9 of a flux removing means 7c in this embodiment is divided into three tanks, a low temperature tank a, a high temperature tank b, and a low temperature tank a, by heat exchange partition walls 30, 30 made of a material having high heat conductivity. At one end of each of the low temperature tanks a, there is provided an intake port 17, and at the other end a discharge port 17a is provided, and a zigzag passage is formed with partition walls 13, 13, 13 between the intake port 17 and the discharge port 17aso that the cooling air 16a which is sucked in comes in through the intake port 17, passes through the zigzag passage, and is discharged as exhaust cooling air 16b through the discharge port 17a. Furthermore, the exhaust gas intake port 10 is provided at one end of the high temperature tank b, and the discharge port 11 is provided at the other end thereof, a zigzag passage is formed with partition walls 13, 13, 13 between the exhaust gas intake port 10 and the discharge port 11, and filters 12, 12 are provided in the zigzag passage, so that the exhaust gas 14 which is sucked in comes in through the exhaust gas intake port 10, passes through the zigzag passage and the filters 12, 12, and is discharged as discharged exhaust gas 15 through the discharge port 11.

With the above arrangement, heat of the sucked-in exhaust gas 14 which passes through the zigzag passage of the high temperature tank b is absorbed through the heat exchange partition walls 30, 30 by the cooling air which passes through the zigzag passage of the low temperature tanks a, by which the temperature of the sucked-in exhaust gas 14 becomes 70° C. and below, and the vaporized components such as flux contained therein are liquefied or solidified and thereby removed with the filters 12, 12. Optionally mention, any other cooling medium can be used instead of the cooling air.

With the above described construction, control of the amount of discharged exhaust gas can be facilitated in the reflow soldering device 1 of this embodiment, since the amount of air blown by the discharge blower 8 is equal to the amount of discharged exhaust gas.

A sixth embodiment of the reflow soldering device of the present invention will be described referring to FIG. 1 and FIG. 10. In this embodiment, the exhaust gas at high temperature is cooled to 70° C. by a heat exchange means, by which vaporized components such as flux are liquefied or solidified and removed with a filter.

The structure of the reflow soldering device 1 of this embodiment shown in FIG. 1 is identical to that of the first embodiment except for the flux removing means 7, and thus the description thereof with reference to FIG. 1 will be omitted.

Figure 10:
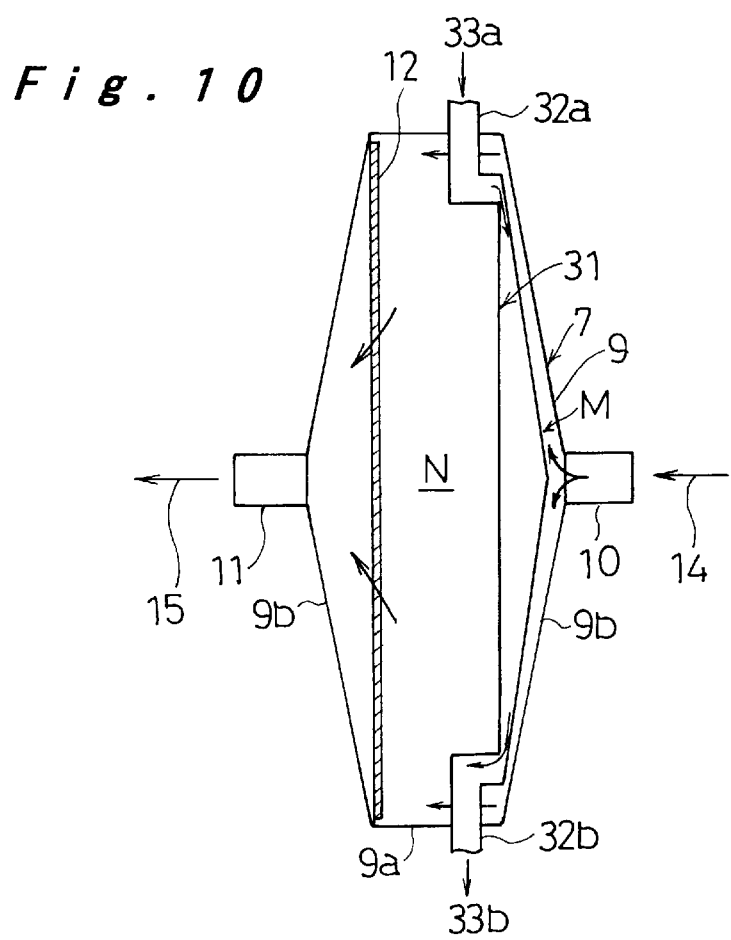
FIG. 10 is a cross-sectional view showing primary parts of the flux removing means in the reflow soldering device according to a sixth embodiment of the present invention.

As shown in FIG. 10, the case 9 of a flux removing means 7d in this embodiment comprises a cylinder 9a and a pair of conical portions 9b, 9b on either side of the cylinder 9a. The exhaust gas intake port 10 is provided on the top of one of the conical portions 9b, through which the exhaust gas 14 is sucked in. The exhaust gas discharge port 11 is provided at the top of the other conical portions 9b, through which the exhaust gas 15 is discharged.

Inside the conical portion 9b to which the exhaust gas discharge port 10 is provided, an air flow cooling means 31 of conical shape is mounted coaxially with the conical portion 9b, forming a small space M of umbrella shape between the outer surface of itself and the inner side of the conical portion 9b. The sucked-in exhaust gas 14 which is taken in through the exhaust gas intake port 10 is efficiently cooled when passing through this space M of umbrella shape by the air flow cooling means 31. The temperature of the exhaust gas 14 is further lowered to 70° C. and below during moving from the space M toward a wider space N within the case 9 due to adiabatic expansion. The air flow cooling means 31 is provided with an inlet 32a and an outlet 32b, through which flowing-in cool air 33a flows in and flowing-out cool air 33b flows out, respectively.

The filter 12 is mounted at the discharge port side of the cylinder 9a, by which the flux component in the intake exhaust gas 14 cooled down to 70° C. and below, which has been liquefied or solidified, is strained and removed. The exhaust gas 15 from which the flux component has been strained is discharged from the exhaust gas discharge port 11.

It is to be noted that a liquid of low temperature may be used instead of the cool air in this embodiment.

With the above described construction, control of the amount of discharged exhaust gas can be facilitated in the reflow soldering device 1 of this embodiment, since the amount of air blown by the discharge blower 8 is equal to the amount of discharged exhaust gas.

INDUSTRIAL APPLICABILITY

The reflow soldering device of the present invention is useful as set forth above, since any vaporized components such as flux contained in an exhaust gas of high temperature escaped from the heating means can be removed with the flux removing means with a filter by making the exhaust gas liquid or solid, or by dissolving the vaporized component in a solvent, by which the exhaust gas discharged into a discharge duct outside of the flux removing means in the factory can be made clean.

What is claimed is:

1. A reflow soldering device for soldering a circuit substrate, comprising:

a conveyor means for transferring the circuit substrate;

a heating means for heating the circuit substrate during transfer and effecting reflow soldering of the circuit substrate;

a cooling means for cooling the circuit substrate after it is reflow soldered by the heating means;

discharge pipes and a discharge blower for discharging an exhaust gas at high temperature escaped from the heating means to outside of the reflow soldering device; and a flux removing means, mounted in the discharge pipes, for causing a vaporized component contained in the exhaust gas to become liquid or solid by cooling the exhaust gas to a temperature lower than 70° C. by mixing outdoor air with the exhaust gas, and for removing the liquefied or solidified component by straining with a filter.

2. The reflow soldering device according to claim 1, wherein the flux removing means intakes the outdoor air at room temperature.

3. The reflow soldering device according to claim 1, further comprising means for cooling the outdoor air to a temperature that is lower than room temperature prior to said flux removing means mixing the outdoor air with the exhaust gas.

4. The reflow soldering device according to claim 1, further comprising means for maintaining a temperature of the outdoor air at a predetermined level prior to said flux removing means mixing the outdoor air with the exhaust gas.

5. The reflow soldering device according to claim 4, further comprising:
   means for detecting a temperature of the exhaust gas before and after it is passed through the filter; and
   said means for maintaining the temperature of the outdoor air controlling the temperature of the outdoor air to keep a temperature of said exhaust gas detected by the means for detecting temperature, before the exhaust gas is passed through the filter, at 70° C. and below.

6. The reflow soldering device according to claim 1, further comprising:
   means for detecting a difference in pressure of the exhaust gas before entering the flux removing means and after leaving the flux removing means: and
   an alarm means for generating an alarm if the difference in pressure exceeds a predetermined value for indicating that the filter is clogged.

7. A reflow soldering device for soldering a circuit substrate, comprising:
   a heater unit which effects reflow soldering of the circuit substrate;
   a conveyor which transfers the circuit substrate through the heater unit;
   a discharge path for discharging an exhaust gas at high temperature from the heater unit;
   a blower for drawing the exhaust gas through the discharge path to outside of the reflow soldering device;
   a flux extractor, disposed in the discharge path, for condensing a vaporized flux component contained in the exhaust gas to one of a liquid and a solid by cooling the exhaust gas to a temperature lower than 70° C. by mixing ambient air with the exhaust gas; and
   said flux extractor having a filter for collecting said one of a liquid and a solid.

8. The reflow soldering device according to claim 7, wherein the flux extractor intakes ambient air at room temperature.

9. The reflow soldering device according to claim 7, further comprising a cooling device which cools the ambient air to a temperature that is lower than room temperature prior to said flux extractor mixing the ambient air with the exhaust gas.

10. The reflow soldering device according to claim 7, further comprising a temperature controller for maintaining a temperature of the ambient air at a predetermined level prior to said flux extractor mixing the ambient air with the exhaust gas.

11. The reflow soldering device according to claim 10, further comprising:
    a temperature detector for detecting a temperature of the exhaust gas in the flux extractor; and
    said temperature controller controlling the temperature of the ambient air to keep the temperature of said exhaust gas at 70° C. and below.

12. The reflow soldering device according to claim 7, further comprising:
    pressure detectors detecting a difference in pressure of the exhaust gas entering the flux extractor and leaving the flux extractor; and
    an alarm means for generating an alarm if the difference in the pressure exceeds a predetermined value for indicating that the filter is clogged.

* * * * *